United States Patent [19]
Roberts et al.

[11] Patent Number: 5,832,255
[45] Date of Patent: Nov. 3, 1998

[54] SYSTEM AND METHOD FOR SELECTING A SIGNAL SOURCE TO TRIGGER A MICROPROCESSOR COUNTER/TIMER MACRO CELL

[75] Inventors: Michael Roberts; Raed Sabha, both of Vancouver, Wash.

[73] Assignees: Sharp Microelectronics Technology, Inc., Camas, Wash.; Sharp Kabushiki Kaisha, Osaka, Japan

[21] Appl. No.: 621,118

[22] Filed: Mar. 22, 1996

[51] Int. Cl.$^6$ ........................................................ G06F 1/04
[52] U.S. Cl. .......................... 395/555; 395/557; 395/559
[58] Field of Search ..................... 395/555, 557, 395/559, 560; 377/107, 111

[56] References Cited

U.S. PATENT DOCUMENTS

| | | | |
|---|---|---|---|
| 4,348,743 | 9/1982 | Dozier ..................................... | 364/900 |
| 4,942,522 | 7/1990 | Wilkie et al. ............................ | 395/557 |
| 5,535,376 | 7/1996 | Catherwood et al. ................... | 395/557 |
| 5,689,690 | 11/1997 | Lesmeister et al. ..................... | 395/555 |

OTHER PUBLICATIONS

Wescon Technical Papers, vol. 26, Sep. 1982, North Hollywood US, pp. 1–6, XP002034086, Patel R.: "The NS80CX48, a new CMOS, Single Chip Microcomputer for Critical Control and Low Power Appl."*p. 3, left–hand column, line 17—right–hand column, line 20; fig. 2,6.

Elektronik, vol. 38, No. 20, 29 Sep. 1989, pp. 84, 86–91, XP000067502, Alab M; "'Intelligente' Sensoren IM Automobil Bessere Daten Durch Integrierten mikrocontroller" pp. 87, right–hand column, line 32—pp. 88, right–hand column, line 2; fig. 5.

Wescon Technical Papers, vol. 27, 1983, North Hollywood US, XP002034087, Melear C.: "MC6805 Family Offers Multi–Function Capability", p. 5, left–hand column, line 4—p. 8, line 10, fig. 6.

MC68328 (DragonBall)™ Integrated Processor User's Manual, ©Motorola, 1995; pp. 6–1 to 6–8, pp. 11–1 to 11–4.

Application Notes for 80C51–Based 8–Bit Microcontrollers; Philips Semiconductors, Jul. 1993; pp. 4–27 to 4–33.

1990 Single–Chip Microcontroller Data Book, NEC Electronics Inc., May 1990, Document No. 50053; pp. 7–3 to 7–19.

National Semiconductor, Advance Information, Sep. 1995, NS486™SXF Optimized 32–Bit 486–Class Controller with On–Chip Periphals for Embedded Systems.

Article entitled RISC–Based Single–Chip Processor Targets PDAs, by Peter Fletcher in Electronic Design/Nov. 20, 1995, pp. 55–56, 60, 62, 64.

*Primary Examiner*—Dennis M. Butler
*Attorney, Agent, or Firm*—Gerald W. Maliszewski; David C. Ripma

[57] ABSTRACT

A system and method has been provided to selectively deliver a plurality of trigger signals to a counter/timer embedded in a microprocessor. The method provides the step of selecting a signal, from either internal or external sources, to trigger the counter/timer. If an internal source is selected, the method provides the step of selecting either a synchronous or non-synchronous signal source to trigger the counter/timer. Regardless of the source chosen, the method includes the step of generating a signal output from the selected source, and the further step of delivering the trigger signal on a dedicated connection. The method of the present invention also includes the step of counting clock cycles in response to the arrival of the trigger signal to the counter/timer. An apparatus to selectively deliver a trigger signal to a counter/timer embedded in a microprocessor from a plurality of signal sources is also provided. The apparatus includes an internal on-chip signal path extending between an internal PWM and the counter/timer, whereby the PWM can serve as the source of the trigger signal.

28 Claims, 5 Drawing Sheets

SYSTEM AND METHOD FOR SELECTING A SIGNAL SOURCE TO TRIGGER A MICROPROCESSOR COUNTER/TIMER MACRO CELL

BACKGROUND AND SUMMARY OF THE INVENTION

The present invention relates generally to integrated circuits, and more particularly to an integrated microprocessor which includes a counter/timer, and the system and method used to select a signal to trigger the counter/timer in the microprocessor integrated circuit.

Counter/timers are used in a number of applications, and are particularly useful for various timing functions, and in translating analog measurements into digital representations. A typical counter/timer has at least two inputs and an output. The first input accepts a clock signal, and the second input accepts a trigger signal to enable the counter/timer to count. The counter/time counts the number of clock cycles occurring during the time that it is enabled. The number of clock cycles counted as a result of the counter/timer being enabled is output by the counter/timer device in a digital format, i.e., as a 16-bit binary number.

One use of a counter/timer is as a means to measure the frequency of occurrences or events. If the counter/timer is enabled, or triggered, for a known time interval, then the number of events occurring during this known period can be measured. The counter/timer output is then directly proportional to events per second, or the frequency of the events. Another use of a counter/timer is to measure a time between occurrences or events. If the counter/timer is supplied with a clock having a known frequency, then a first event can be used to enable the counting of clock cycles and a second event can be used to disable the triggering clock cycles. The number of clock cycles counted between the two events is directly proportional to the time between the occurrence of the two events.

Likewise, a counter/timer can be used to measure distance. When the time of an event occurrence is well known, but the position of the event source is unknown, then any delay in the measurement of the event occurrence can be related to the distance of the source from the destination. Once again, the counter/time is supplied with a clock having a known frequency. The known time of the occurrence is used to trigger the counting and the actual measurement of the occurrence is used to disable the counting. The number of clock cycles between the two trigger signals is directly proportional to delay, and can be translated into a measurement of distance if the propagation delay characteristics of the medium between the source and destination are understood. A counter/timer can also be used to measure time delay associated with digital circuitry functions in performing software controlled functions that vary due to the interrupts to the software program or changes in the clock speed.

It is well known in the art to use the digitally formatted output data of counter/timers in systems including a microprocessor. The microprocessor is able to store the counter/timer output data in memory, and use this digital data in a number of applications. The microprocessor is able to mathematically manipulate the data, compare the data with previous measurements, and display the data in a format useful to a user. Microprocessors and counter/timers are often used together in feedback systems in which analog data is converted into a digital format for storage and analysis. The digitally formatted data is compared to a reference value by the microprocessor. The microprocessor calculates changes that must be made in the control function to maintain the measured value within a range of values around the reference value. The microprocessor then executes commands to control the function accordingly. The microprocessor then remeasures the analog data. An example of such a feedback control system is one that controls the fuel injection system of an automobile, see "Counter/timer 2 of the 83C552 Microcontroller", Application Notes for the 80C51-Based 8-Bit Microcontrollers, AN418, pg. 4–27, Philips Semiconductor, 1993.

Since counter/timers are used in a number of applications with microprocessors, it is well known in the prior art to include a counter/timer as a macro cell internal to the integrated microprocessor. Likewise, it is well known in the prior art to include a plurality of counter/timer macro cells internal to a microprocessor. The microprocessor is able to store the counter/timer output data in registers and then access these registers through the microprocessor internal data bus. The data bus can then move this data to memory for storage, or to the CPU for further processing. Likewise, the microprocessor supplies the counter/timer macro cell with a known system clock through an internal connection, or a plurality of system clocks depending on the counter/timer application. In the prior art, the counter/timer gate input is accessible only through an operative connection to an external interface pin of the microprocessor in which the counter/timer is embedded.

The National Semiconductor NS486™ is an example of an integrated microprocessor having internal counter/timers. The microprocessor supplies the clock signal to the counter/timers through a connection internal to the microprocessor. The counter/timer gate input accepts the trigger signals through external interface pins labeled "T0 and T1." The Philips Semiconductor PR30100 IC is another example of an integrated microprocessor having internal counter/timers that are triggered through the external interface pins of the device.

A pulse width modulator (PWM) is often used as a trigger source to enable and disable the counting of clock cycles. The pulse width modulator is a particularly useful trigger source since the frequency and pulse width of the trigger signal are easily adjustable. It is well known in the prior art to include a pulse width modulator as a macro cell internal to the integrated microprocessor. A PWM internal to a microprocessor is accessed through an external interface pin of the microprocessor.

It is well known to provide a trigger signal to the counter/timer gate input from a variety of sources. Signal sources, including PWMs, external to a microprocessor, provide a trigger signal to a counter/timer located internally to microprocessor through the counter/timer external interface pin. It is often convenient for a user to use a PWM located internal to the microprocessor, to trigger a counter/timer located internal to the integrated microprocessor. The internally located PWM output provides a trigger signal to the internally located counter/timer gate input by placing an electrical conductor between the external interface pin operatively connected to the PWM output and the external interface pin operatively connected to the counter/timer gate input. Thus, a control system requiring a microprocessor, counter/timer, and PWM is easily built by connecting together two pins of the integrated microprocessor, and commanding the microprocessor with a suitable set of instructions to control the PWM trigger signal and accept the counter/timer output data.

The Motorola MC68328 (Dragonball™) is a microprocessor having both internal counter/timers and internal PWMs. The clock input to the counter/timers is delivered internal to the integrated microprocessor, as are commands to the PWMs. The counter/timer gate input, TIN, is accessed through an external interface pin. Likewise, the PWM output signal, PWMOUT, is accessed through an external interface pin. To trigger the counter/timer from the PWM, the external interface pins must be joined by an electrical conductor such as a wire or a trace on a printed circuit board. The NEC Electronics Inc. uPD7831xA is another example of an integrated microprocessor having internal counter/timers and PWMs. As with the Motorola device, the NEC PWM outputs and counter/timer gate inputs are accessed through external interface pins.

While it is convenient, in many applications, to join the counter/timer macro cell and PWM macro cell of a microprocessor, the requirement of an external connection is limiting. Joining the PWM and counter/timer with a hard wire connection dedicates the two macro cells to one another so that they are difficult to use in other applications. That is, the microprocessor connection configuration is inconvenient in applications where the internal counter/timer is preferably triggered from multiple signal sources. If an internal counter/timer is "hard-wired", or permanently connected, to a first internal PWM, it cannot be triggered from an external trigger source or from a different signal source internal to the microprocessor. Likewise, it may be desirable to use the hard-wired PWM macro cell to trigger devices external to the microprocessor.

The use of a hard-wire connection between an internal counter/timer and an internal PWM requires that the external connection be broken and reconnected to another source for many alternate applications of the counter/timer. Thus, time and effort must be spent to change the connection. Alternately, if the connections are not changed, the microprocessor is dedicated to a limited number of applications in a circuit, and parallel microprocessors, or other integrated logic function devices, must be added to perform alternate tasks. The above mentioned limitation is especially telling when the user would seek to dynamically change counter/timer trigger sources, or change "on the fly", so that the same counter/timer rapidly switches between a plurality of trigger sources for parallel applications. With prior art devices a counter/timer can rapidly change signal sources only by means of a switching network external to the microprocessor. This external network, however, requires additional parts, and slows the system as the microprocessor must command the network to switch when a different source is desired.

It would be desirable if an integrated microprocessor could be used to select the signal source to trigger an internally located counter/timer. It would also be advantageous if the signal source was a PWM.

It would be advantageous if the connection between the PWM output trigger signal and the counter/timer gate input accepting the trigger signal was internal to the microprocessor so that an external wire connecting microprocessor interface pins was not required. It would also be advantageous if this internal connection between the counter/timer and the PWM was selectable so that the connection could be made or interrupted through the execution of commands on the internal data bus of the microprocessor.

It would be advantageous if the counter/timer macro cell in an integrated microprocessor was internally connected to a plurality of internal signal sources in the microprocessor, and further if the microprocessor could selectively connect the counter/timer macro cell to one of the plurality of internal signal sources.

It would be advantageous if one of the plurality of internal trigger sources was a non-synchronous signal source for applications not requiring a precision count. That is, it would be advantageous if the counting of clock cycles by the counter/timer macro cell was dependent merely on the time of arrival of commands on the internal data bus to the counter/timer.

It would be advantageous if the counter/timer macro cell in a microprocessor could be selectively connected to an external trigger source via an external interface pin, and further, if the counter/timer could be selectively connected to the external source in addition to being selectively connectable to a plurality of signal sources, including a PWM, internal to the microprocessor. It would be advantageous if an integrated microprocessor had a plurality of counter/timers that could be selectively connectable to both internal and external trigger sources.

Accordingly, a system has been provided to selectively provide a trigger source to a counter/timer internal to an integrated microprocessor with macro cells including a central processing unit (CPU), the microprocessor also including an internal data bus to communicate between macro cells, external interface pins, and a system clock to provide a clock signal. The system of macro cells comprises a counter/timer macro cell having a clock input to receive the system clock, a gate input responsive to trigger signals for counting clock cycles, and a gate control input operatively connected to the internal bus for controlling the selection of a signal source to trigger said counter/timer gate input. The system of macro cells also comprises a first signal source having an output, said first signal output providing an output signal to trigger the clock count in said counter/timer, and a first dedicated connection, internal to the microprocessor, selectively providing a trigger signal to said counter/timer gate input from said first signal source output in a response to commands on the internal data bus.

In a preferred form of the invention the first signal source is a PWM. It is also a feature of this invention that the counter/timer is selectively connectable to a plurality of trigger signal sources. The invention is selectively connectable to an external signal source via the microprocessor external interface pin. It is also a feature of the invention that the counter/timer gate input is selectively connectable to a first DC voltage, or first logic level, by commands on the internal data bus to start the clock count and also selectively connectable to a second DC voltage, or second logic level, to stop the counting of the clock signal by the counter/timer.

In one alternative of the invention, a signal multiplexer is used to provide the selective dedicated connections between the counter/timer gate input and the plurality of signal sources.

A method has also been provided for selecting a signal source to provide a trigger signal in an integrated microprocessor with macro cells including a central processing unit (CPU), a counter/timer, and a first signal source, the microprocessor also including an internal data bus and a plurality of dedicated internal connections to communicate between macro cells, an external data bus to accept user commends, external interface pins, and a system clock. The method for controlling including the steps of selecting the first signal source in response to commands on the internal data bus. The method including the step of generating a first signal source output to provide the trigger signal to the counter/timer gate input. The method also including the step of delivering the trigger signal to the counter/timer gate input on a first dedicated connection internal to the microprocessor. The method including the step of counting system clock cycles by the counter/timer in response to the arrival of the trigger signal, and the step of creating a counter/timer output signal in response to programming from the CPU, whereby the internal data bus is used to select the first signal source output signal as the counter/timer trigger source.

In a preferred form of the present invention, the first signal source is a pulse width modulator. It is also a feature of the present invention to provide a step for selecting the trigger signal to the counter/timer gate input from a plurality of signal sources. The signal sources including an external source operatively connected via an external interface pin, a first DC voltage to start the counting clock cycles in the counter/timer, and a second DC voltage to stop the counting of the clock cycles. One alternative of the present invention includes the step of selectively connecting the counter/timer gate input to a signal source with a signal multiplexer.

The present invention is particularly useful because the microprocessor is able to control the trigger source of a counter/timer macro cell. The selection of the trigger source is often dependent on a particular application and can be made "on the fly" through instructions on the internal data bus. Therefore, a particular counter/timer macro cell, or PWM macro cell, can be reconnected and reconfigured to operate with alternate interfaces, both internal to the microprocessor and external, as the microprocessor changes tasks. Likewise, the PC board on which the microprocessor of the present invention is placed need not be changed, or the wiring between pins need not be reconfigured, for each counter/timer application. The flexibility of the present invention allows it to be used in a greater variety of control tasks, and generally lowers the cost of performing a variety of control functions.

DETAILED DESCRIPTION OF THE PREFERRED EMBODIMENT

Figure 1:
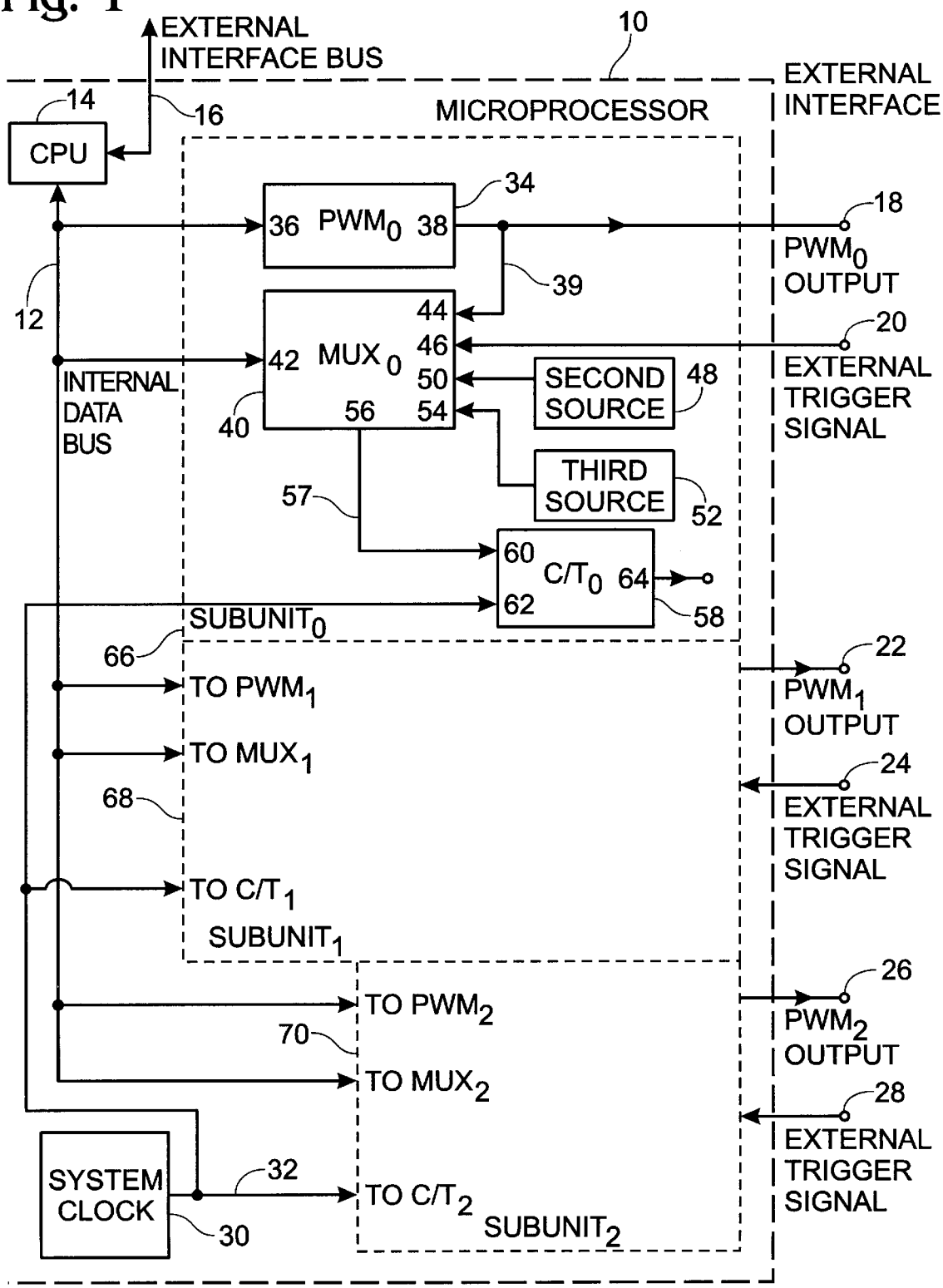
FIG. 1 is a schematic drawing of a system of counter/timers in an integrated microprocessor selectively connectable to a plurality of signal sources including a pulse width modulator.

FIG. 1 is a schematic drawing of a system of counter/timers in an integrated microprocessor selectively connectable to a plurality of signal sources including a pulse width modulator. An integrated microprocessor 10 is shown bounded by a dotted line representing the external interface. Microprocessor 10 includes elements in addition to those shown in FIG. 1 which is why the dashed line boundary extends off the sheet. As is well known in the art, microprocessors comprise a number of macro cells on a single chip, including a central processing unit (CPU), further comprising arithmetic, logic, control, and memory circuitry. An internal data bus 12 and a plurality of dedicated internal connections are operatively connected to a plurality of macro cells internal to microprocessor 10 to communicate between macro cells. The CPU 14 is accessible to a user through an external interface bus 16. Microprocessor 10 also has a plurality of external interface pins 18–28. Microprocessor 10 includes a system clock 30 having a clock output 32 to provide a system clock signal to a plurality of macro cells inside microprocessor 10.

Internal data bus 12 is operatively connected to a pulse width modulator$_0$ macro cell (PWM$_0$) 34, alternately known as first signal source 34. Once properly addressed by an address bus (not shown), PWM$_0$ input 36 accepts commands from internal data bus 12. First signal, or PWM$_0$, output 38 provides a trigger signal having a preselected frequency and preselected pulse width. PWM$_0$ input 36 is operatively connected to receive commands for selectively controlling the frequency and pulse width of the first signal output signal. PWM$_0$ output 38 is operatively connected to external interface pin 18.

MUX$_0$ macro cell 40, having a MUX$_0$ control input 42 is operatively connected to internal data bus 12 to receive connection commands. Once MUX$_0$ 40 is properly addressed, connection commands on internal data bus 12 can be received by MUX$_0$ control input 42 to select a MUX$_0$ input signal. First signal input 44 is connected to PWM$_0$, or first signal, output 38 through an internal, and exclusive signal path, 39 to provide a trigger signal. An external signal source (not shown), external to microprocessor 10, having an output operatively connected to external interface pin 20 also provides a trigger signal. External interface signal input 46 is operatively connected to the external signal source output via external interface pin 20. A second source 48 has an output, second signal source 48 output provides a trigger signal at a first DC voltage to start the counting of the clock signals. The first DC voltage may, for example, be a logic high signal. The output of second source 48 is operatively connected to second signal input 50. A third source 52 has an output, the third signal source 52 provides a trigger signal at a second DC voltage to stop the counting of the clock signals, and is operatively connected to MUX$_0$ third signal input 54. The second DC voltage may, for example, be a logic low signal. MUX$_0$ 40 selectively connects one of the signal inputs (44, 46, 50, or 54) to a MUX$_0$ output 56 to provide a trigger signal in response to connection commands received at MUX$_0$ control input 42 from internal data bus 12.

A counter/timer$_0$ macro cell, (C/T$_0$), 58 has a counter/timer$_0$ gate input 60 responsive to trigger signals for counting clock cycles. MUX$_0$ output 56 is connected to counter/timer gate input 60 through an internal, and exclusive, signal path 57. Counter/timer$_0$ clock input 62 is operatively connected to system clock 30 to receive the system clock signal. Counter/timer$_0$ 58 counts the number of clock cycles received at counter/timer$_0$ clock input 62 during the time it is enabled by a trigger signal on counter/timer$_0$ gate input 60. The clock count is output in a digital format on counter/timer$_0$ output 64. The digital format is typically 8 or 16 bits of information expressing the clock count as binary or binary-coded decimal (BCD) numbers.

Thus, MUX$_0$ 40 allows the following connections to occur. MUX$_0$ 40 selectively connects MUX$_0$ first signal input 44 to MUX$_0$ output 56 in response to connection commands received at $MUX_0$ control input 42. $MUX_0$ 40 selectively connects counter/timer gate input 60 to the external signal source in response to commands on internal data bus 12 to $MUX_0$ control input 42. $MUX_0$ 40 has a $MUX_0$ second signal input 50 operatively connected to second signal source 48 output to selectively provide counter/timer gate input 60 with second signal source 48 trigger signal in response to commands on internal data bus 12 to $MUX_0$ control input 42. $MUX_0$ 40 has a $MUX_0$ third signal input 54 operatively connected to third signal source 52 output to selectively provide counter/timer gate input 60 with third signal source 52 trigger signal in response to commands on internal data bus 12 to $MUX_0$ control input 42.

Alternately, $MUX_0$ 40 may be considered as a specific mode of gate control input for counter/timer$_0$ 58, and the various $MUX_0$ signal inputs (44, 46, 50, and 54) a specific mode of dedicated connections, internal to the microprocessor, to selectively provide a trigger signal to counter/timer$_0$ gate input 60 from one of the signal sources in response to commands on internal data bus 12. In this manner, the gate input is operatively connected to internal data bus 12 to control the selection of a signal source to trigger the counter/timer$_0$ gate input 60. The selection of $MUX_0$ first signal input 44 is the first dedicated connection. The selection of $MUX_0$ external interface signal input 46 is the external interface dedicated connection. The selection of $MUX_0$ second signal input 50 is the second dedicated connection. The selection of $MUX_0$ third signal input 54 is the third dedicated connection.

When $MUX_0$ first signal input 44 is used, a first dedicated connection, internal to the microprocessor, selectively provides a trigger signal to counter/timer$_0$ gate input 60 from first signal source output 38 in response to commands on internal data bus 12. When external interface signal input 46 is used, an external interface dedicated connection, internal to the microprocessor, selectively provides the trigger signal to counter/timer$_0$ gate input 60 from the external signal source via external interface pin 20, in response to commands on internal data bus 12. When $MUX_0$ second signal input 50 is used, a second dedicated connection, internal to the microprocessor, selectively provides the trigger signal to counter/timer$_0$ gate input 60 from second signal source 48 in response to commands on internal data bus 12. When $MUX_0$ third signal input 54 is used, a third dedicated connection, internal to the microprocessor, selectively provides the trigger signal to counter/timer$_0$ gate input 60 from third signal source 52 in response to commands on internal data bus 12.

Further, $MUX_0$ first signal input 44 provides a first selective connection, internal to the microprocessor, synchronously connecting output 38 of first signal source 34 to counter/timer$_0$ gate input 60 to provide a trigger signal in response to commands on internal data bus 12. The connection is synchronous because it is a dedicated electrical connection internal to the microprocessor having a predetermined uniform propagation delay. When $MUX_0$ second signal input 50 is used, a second selective connection, internal to the microprocessor, non-synchronously connects the output of second signal source 48 to counter/timer$_0$ gate input 60, to provide a trigger signal in response to commands on internal data bus 12. When $MUX_0$ third signal input 54 is used, a third selective connection, internal to the microprocessor, non-synchronously connects the output of third signal source 52 to counter/timer$_0$ gate input 60, to provide a trigger signal in response to commands on internal data bus 12. The second and third connections are non-synchronous since the arrival of the trigger signals to counter/timer$_0$ 58 from signal sources 48 and 52 does not occur after a predetermined uniform delay of time. The delay is, instead, dependent on the CPU 14 executing commands on internal data bus 12. The arrival to commands to select signal sources 48 and 52 varies according to the CPU 14 clock speed and the number of CPU 14 higher priority interrupts occurring during the execution of the commands.

The system of elements described above, including $PWM_0$ 34, $MUX_0$ 40, and counter/timer$_0$ 58 are designated as subunit$_0$ 66. FIG. 1 also shows subunit$_1$ 68 and subunit$_2$ 70. Subunit$_1$ 68 and subunit$_2$ 70 comprise the same elements as subunit$_0$ 66 and function in an equivalent manner. Subunit$_1$ 68 and subunit$_2$ 70 also have equivalent input and output connections. Microprocessor 10 alternately comprises a plurality of n subunits having a plurality of n counter/timers, n PWMs, and n selective connections. Each one of the plurality of n connections providing a selective connection between one of n exclusive pairs formed by combining one of the plurality of PWMs with one of the plurality of counter/timers. In FIG. 1, n=3 subunits (66, 68, and 70). Each subunit having a PWM and counter/timer connected by a dedicated connection.

Alternately, one subunit, i.e., subunit$_2$ 70, accepts clock signals from a second, faster, clock (not shown.) With a faster clock input to subunit$_2$ 70 greater resolution of time increments is possible resulting in measurements of greater precision.

Figure 2:
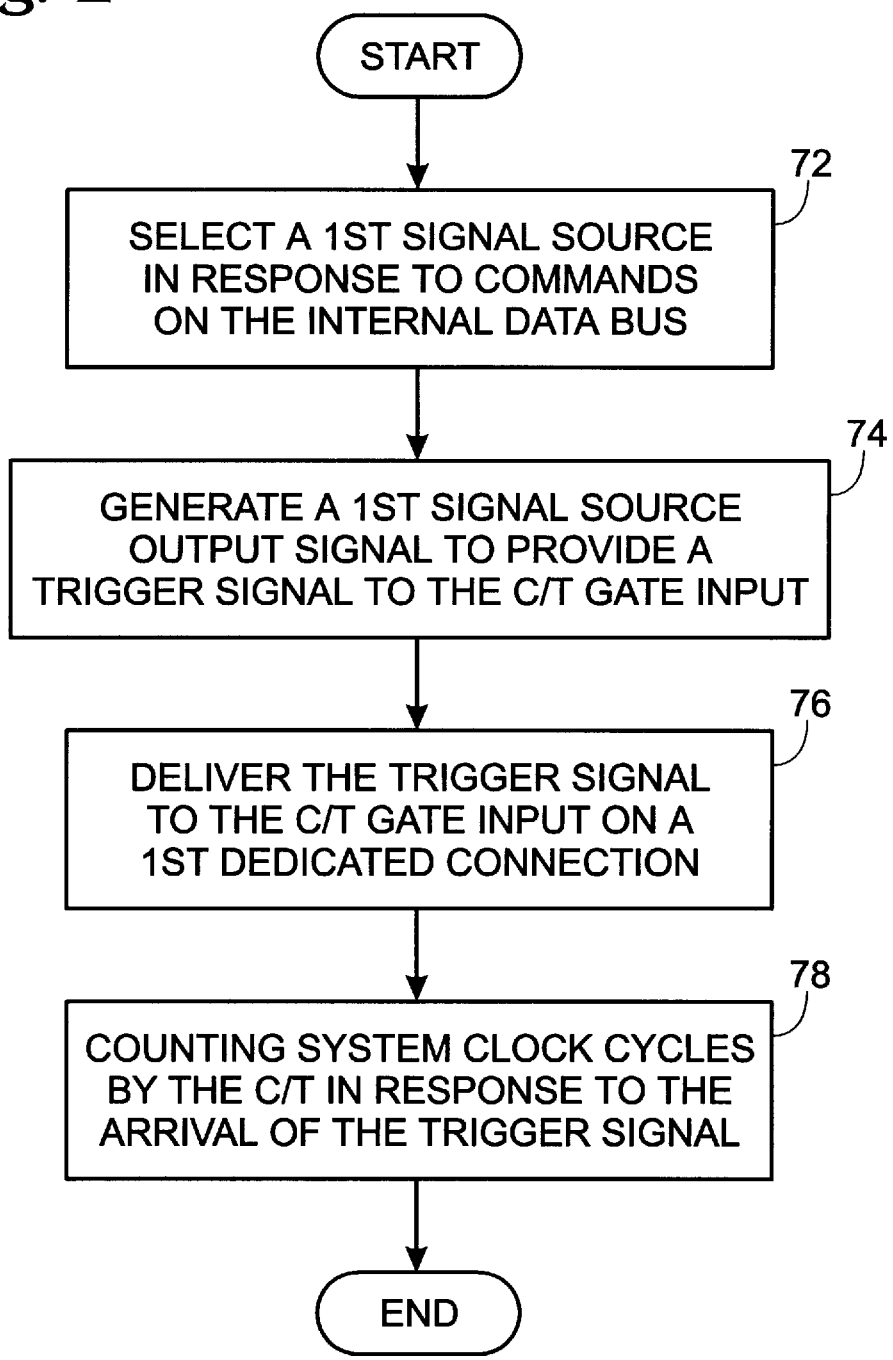
FIG. 2 is a flow diagram illustrating the operation of the system and method of the present invention for delivering a selected trigger signal to the counter/timer from a signal source.

FIG. 2 is a flow diagram illustrating the operation of the system and method of the present invention for delivering a selected trigger signal to the counter/timer gate input from a signal source. The method operates with an integrated microprocessor with macro cells including a CPU, a counter/timer, a first signal source, the microprocessor also including an internal data bus and a plurality of dedicated internal connections to communicate between macro cells, an external data bus to accept user commands, external interface pins, and a system clock. The method for controlling includes a step 72 which selects a first signal source in response to commands on the internal data bus. A step 74 generates a first signal source output signal to provide a trigger signal to the counter/timer gate input. A step 76 delivers the trigger signal to the counter/timer gate input on the first dedicated connection internal to the microprocessor, and a step 78 counts system clock cycles by the counter/timer in response to the arrival of the trigger signal delivered in step 76. Alternately, in step 72 the first signal source is a PWM having a selectable frequency and selectable pulse width generated in response to commands on the internal data bus.

Alternately, with regard to FIG. 2, an external signal source having an output is operatively connected to an external interface pin of the microprocessor provides a trigger signal, and includes the further steps of selecting the external signal source to provide the trigger signal to the counter/timer gate input in response to commands on the internal data bus, and delivering the external source output signal from the external interface pin to the counter/timer input on an external interface dedicated connection, internal to the microprocessor.

Alternately, with regard to FIG. 2, the microprocessor includes a plurality of signal sources, and includes the steps of selecting a second signal source to provide a trigger signal at a first DC voltage to start the counting of the clock signal by the counter/timer in response to commands on the internal data bus, and delivering the second source output signal to the counter/timer gate input on a second dedicated connection internal to the microprocessor. Further steps include the selecting a third signal source to provide a trigger signal at a second DC voltage to stop the counting of the clock signal by the counter/timer in response to commands on the internal data bus, and delivering the third source output signal to the counter/timer gate input on a third dedicated connection internal to the microprocessor.

Figure 3:
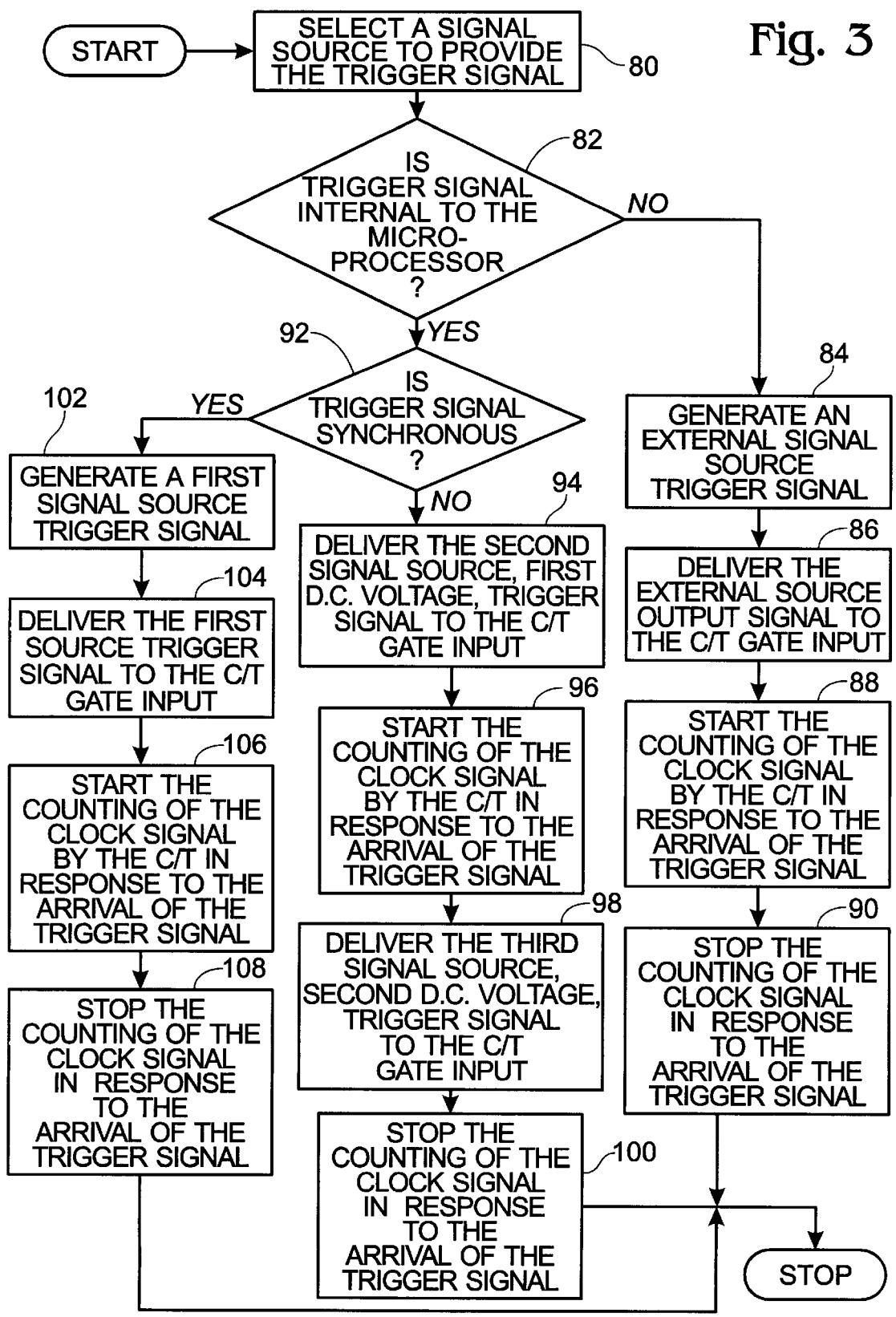
FIG. 3 is a detailed flow diagram of the system and method of the present invention to selectively delivering a trigger signal to the counter/time gate input from a plurality of signal sources.

FIG. 3 is a detailed flow diagram of the system and method of the present invention to selectively delivering a trigger signal to the counter/time gate input from a plurality of signal sources. A step 80 selects a signal source to provide the trigger signal to the counter/timer gate input in response to commands on the internal data bus. A step 82 determines if the selected signal source is internal to the microprocessor. If the selected trigger signal is not internal to the microprocessor, a step 84 generates an external signal source to trigger the counter/timer gate input. A step 86 delivers the external source output signal from the external interface pin to the counter/timer gate input on an external interface dedicated connection internal to the microprocessor. A step 88 starts the counting of the clock signal by the counter/timer in response to the arrival of the trigger signal. A step 90 stops the counting for clock cycles in response to the arrival of the (count stop) trigger signal.

If, in step 82, the selected trigger signal is internal to the microprocessor, then the method proceeds to a step 92. Step 92 determines if the signal source is synchronous. If the selected trigger signal to provide the trigger signal is non-synchronous, then a path is followed to a step 94. Step 94 delivers the second signal source output signal to provide a trigger signal at a first DC voltage to the counter/timer gate input on a second dedicated connection. A step 96 starts the counting of the clock signal by the counter/timer in response to the arrival of the trigger signal. A step 98 delivers the third signal source to provide a trigger signal at a second DC voltage to the counter/timer gate input on a third dedicated connection. A step 100 stops the counting of clock signals in response to the arrival of the (second DC voltage) trigger signal.

If, in step 92, the selected trigger signal is synchronous, then the method proceeds to a step 102. Step 102 generates a PWM, or first, signal source trigger signal. A step 104 delivers the first source trigger signal to the counter/timer gate input on a first dedicated connection, internal to the microprocessor. A step 106 starts the counting of the clock signal by the counter/timer in response to the arrival of the trigger signal. A step 108 stops the counting of the clock signal in response to the arrival of the (stop count) trigger signal.

Alternately, the microprocessor of the method for controlling macro cells of FIGS. 2 and 3 includes a signal multiplexer with a plurality of signal inputs, an output, a control input, and in which the dedicated connections between signal sources and the counter/timer gate input are made through the multiplexer. The first multiplexer signal input is operatively connected to the PWM, or first signal, output. The external interface signal input is operatively connected via the external interface pin to the external signal source. The second multiplexer signal input is operatively connected to the second signal source, and the third multiplexer signal input is operatively connected to the third signal source. Therefore, the first dedicated connection corresponds to the selection of the multiplexer first signal input. The external interface dedicated connection corresponds to the selection of the multiplexer external interface signal input. The second dedicated connection corresponds to the selection of the multiplexer second signal input, and the third dedicated connection corresponds to the selection of the multiplexer third signal input. The method of controlling macro cells alternately includes the step of delivering one of the signal sources (steps 76, 86, 94, 98, and 104 of FIGS. 2 and 3) to the counter/timer gate input through the multiplexer to provide a trigger signal in response to commands on the internal data bus to the multiplexer control input, as described above.

In the method of selective deliverance of trigger signals depicted in FIG. 3 and discussed above, the signal source is used to both start and stop the counting of clock cycles in the counter/timer. In practical applications the counting of clock cycles is typically stopped by an interrupt signal. The interrupt signal coincides with the occurrence of an event which is to be measured by the counter/timer. A practical application of the system and method of the present invention will be given below.

Figure 4:
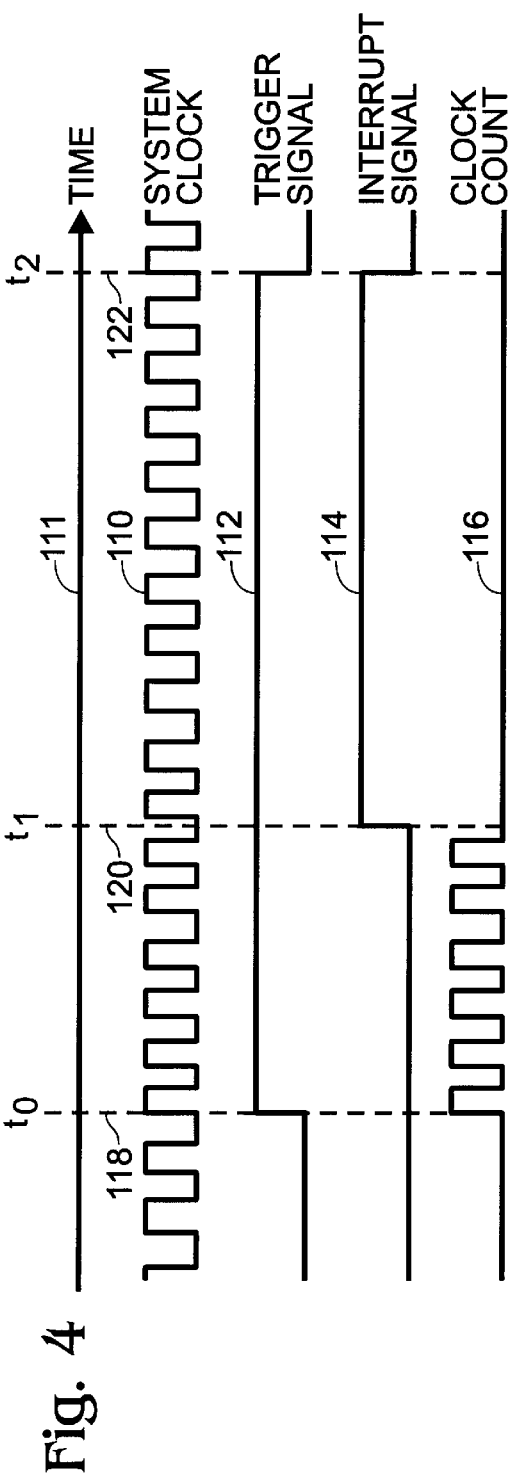
FIG. 4 is a timing diagram illustrating input signals to a counter/timer in a typical counter/timer application.

FIG. 4 is a timing diagram illustrating input signals to a counter/time in a typical counter/timer application. A system clock signal 110 is shown relative to a time displacement line 111. Referencing FIG. 1, system clock signal 110 is the signal output from system clock output 32 and the signal input into counter/timer$_0$ clock input 62. Returning to FIG. 4, a trigger signal 112 is also shown in reference to time line 111 and system clock signal 110. Referencing FIG. 1, trigger signal 112 is input to MUX$_0$ first signal input 44 from PWM$_0$ output 38. Returning to FIG. 4, an interrupt signal 114 is shown referenced to time line 111. Interrupt signal 114 has no cross reference to FIG. 1. Returning to FIG. 4, a clock count 116 is shown referenced to time line 111. Referencing FIG. 1, clock count 116 is a signal internal to counter/timer$_0$ 58. That is, clock count 116 is the analog representation of the number of clock cycles counted before the data is translated into a digital format and output on counter/timer$_0$ output 64.

Returning to FIG. 4, at time t0 118, trigger signal 112 is received by the counter/timer. At $t_0$ 118, the counter/timer begins to accept the system clock signals 110 and a clock count 116 is begun. At time $t_1$ 120, interrupt signal 114 is received by the counter/timer and the clock count is stopped. In the event that no interrupt signal 114 is received by the counter/timer, then the clock count continues until the end of the trigger signal at time $t_2$ 122.

Figure 5:
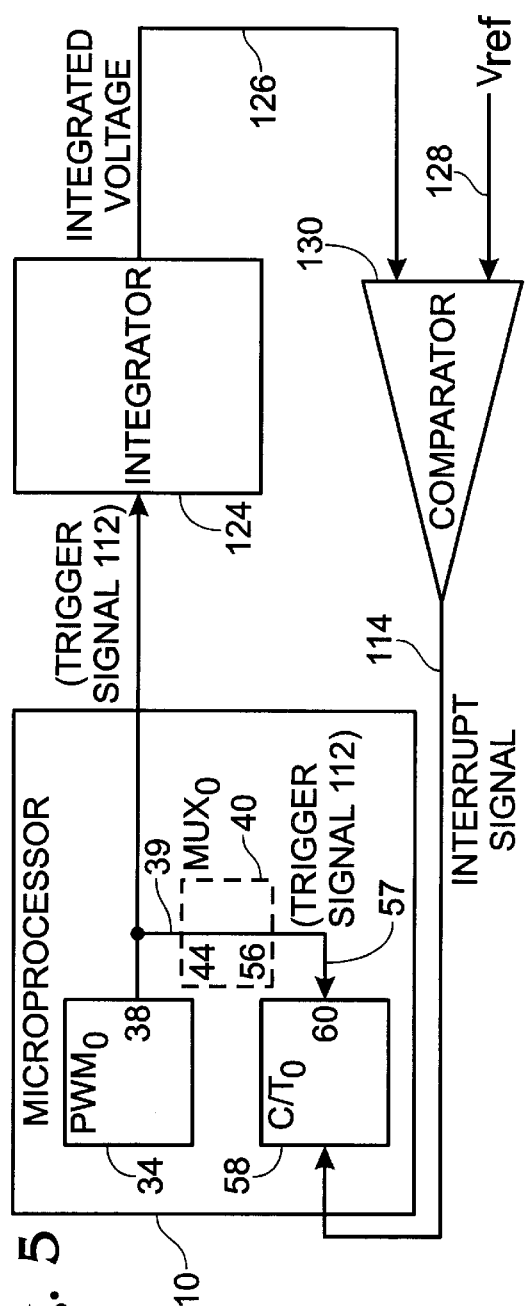
FIG. 5 is a schematic drawing illustrating the apparatus of the present invention interfaced with external devices to perform an analog to digital translation.

FIG. 5 is a schematic drawing illustrating the apparatus of the present invention interfaced with external devices to perform an analog to digital translation. Microprocessor 10 includes PWM$_0$ 34 and counter/timer$_0$ 58, as shown. Trigger signal 112 is provided from PWM$_0$ output 38. Trigger signal 112 is input to an integrator 124 and to counter/timer$_0$ gate input 60. Trigger signal 112 is selectively connected from PWM$_0$ 34 to counter/timer$_0$ 58 through MUX$_0$ 40. Integrator 124 sums the voltage component of trigger signal 112 to create an integrated voltage 126. A typical integrated voltage signal 126 is the classic sawtooth waveform, see FIG. 6. Returning to FIG. 5, integrated voltage 126 is input with a reference voltage, or V$_{ref}$ 128 to a comparator 130. When the voltage level of integrated voltage 126 equals the voltage level of V$_{ref}$ 128, then comparator 130 is triggered, creating interrupt signal 114. V$_{ref}$ 128 is the analog voltage to be measured and translated into a digital format. Interrupt signal 114 is operatively connected to counter/timer$_0$ 58 to stop the counting of clock signals. A timing diagram corresponding to the signals of FIG. 5 is depicted in FIG. 6 below.

Figure 6:
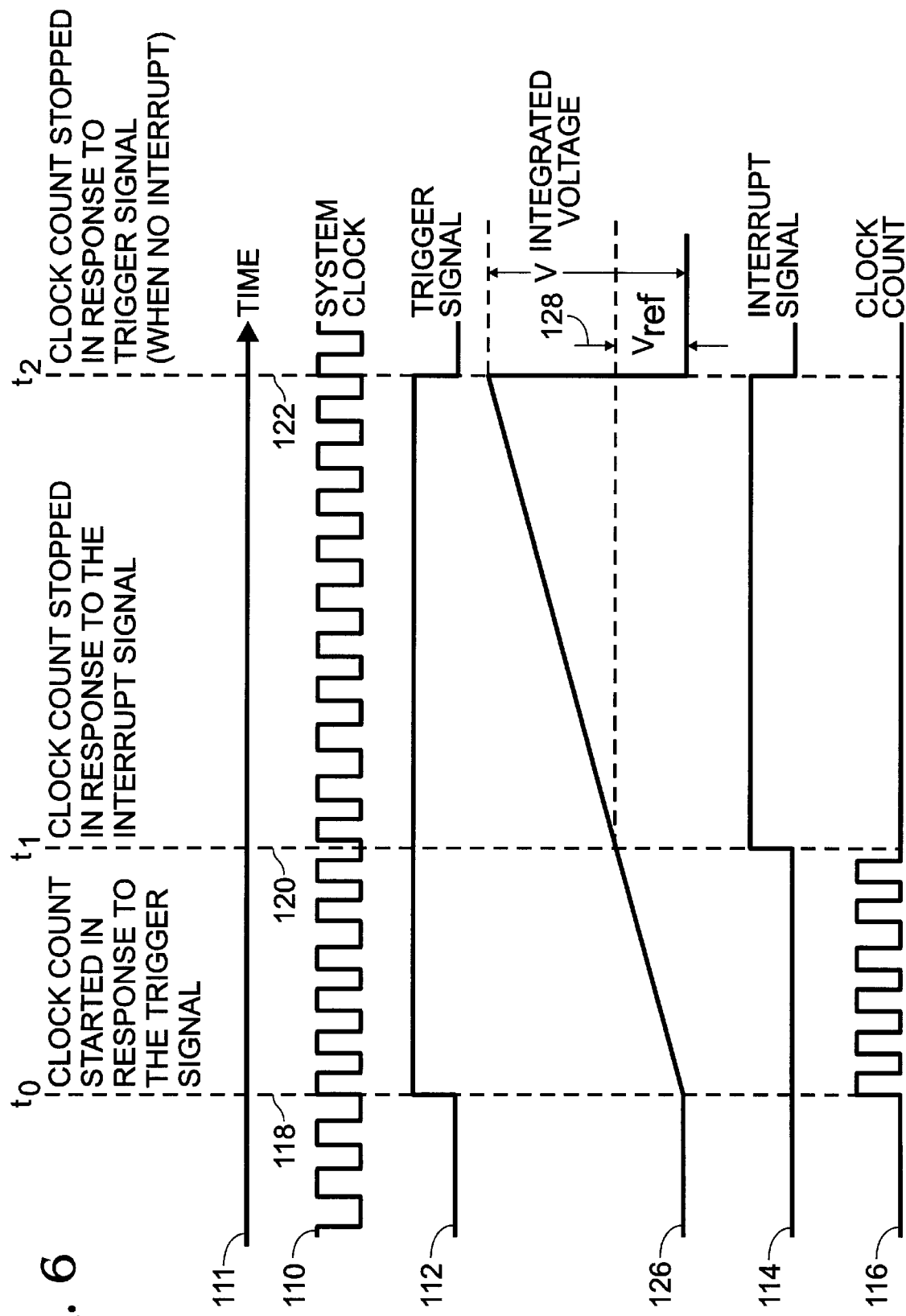
FIG. 6 is a timing diagram illustrating the input signals associated with the analog to digital translation function depicted in FIG. 5.

FIG. 6 is a timing diagram illustrating the input signals associated with the analog to digital translation function depicted in FIG. 5. System clock signal 110 is input into counter/timer$_0$ 58 of FIG. 5. Trigger signal 112 is provided by PWM$_0$ 34 to counter/timer$_0$ 58 and integrator 124, as shown in FIG. 5. Integrated voltage 126 is the output of integrator 124. Returning to FIG. 6, at time t0 118, trigger signal 112 arrives at counter/timer$_0$ gate input 60. At t$_0$ 118, the clock count 116 begins. At t$_1$ 120, integrated voltage 126 reaches the same voltage level as V$_{ref}$ 128. At t$_1$ 120, comparator 130 generates interrupt signal 114. The arrival of interrupt signal 114 at counter/timer$_0$ 58 stops the clock count 116. Clock count 116 is translated into a binary digital format, and output from counter/timer$_0$ 58 for use by microprocessor 10. A look-up table in microprocessor 10, cross referencing the clock cycle count to voltage, is used to calculate the voltage level of V$_{ref}$ 128. In this manner, analog voltage V$_{ref}$ 128 is translated into a digital format for use in microprocessor 10. The digital value can be stored in memory, used to display a signal to microprocessor 10 user, or used in mathematical calculations.

The system and method of the present invention provides an improved technique for using a microprocessor to perform control functions involving a counter/timer. Although prior art devices include counter/timers and PWM circuits imbedded in a microprocessor, they also require the PWM and counter/timer be connected through external interface pins. This reduces the flexibility and alternate uses for the counter/timer and PWM, as the PWM and counter/timer are exclusively dedicated to one another. Therefore, the use of the prior art microprocessors to perform control functions with internal counter/timers is limiting. Prior art microprocessors necessarily perform fewer types of control functions in the circuits in which they are placed. Alternately, different PC boards must be used for different microprocessor applications.

The microprocessor associated with the present invention avoids many of the problems of the prior art devices. The selective connection of the internally imbedded counter/timer with a plurality of trigger sources, both internal and external to the microprocessor, gives the present invention greater flexibility to be used in a variety of parallel applications. The counter/timer can be selectively connected to the internal PWM to perform a first function and then changed on the fly, by the microprocessor through the internal data bus, to perform a second function through the connection of the counter/timer to an alternate signal source. In this manner, the number of microprocessors in a circuit design can be reduced as the microprocessor of the present invention performs a greater number of parallel, or time multiplexed, functions. Alternately, the microprocessor associated with the present invention is able to perform a greater variety of control functions with fewer changes to the circuit board in which it is mounted, as signal connections between the counter/timer are made internal to the microprocessor.

Alternate embodiments of the above described system and method of the present invention can be applied to any type of microprocessor architecture or integrated logic circuit design. Other modifications and variations within the scope of the present invention will occur to those skilled in the art.

What is claimed is:

1. In an integrated microprocessor including a central processing unit (CPU), the microprocessor also including an internal data bus to communicate between macro cells, external interface pins, and a system clock having a clock signal, a system of macro cells comprising:

a first signal source having an output, said first signal source output providing a trigger signal;

a counter/timer having a clock input to receive the system clock signal, and a gate input responsive to trigger signals for counting clock cycles; and a signal multiplexer having a control input operatively connected to the internal data bus to receive connection commands, said multiplexer having a first signal input operatively connected to said first signal source output, and an output operatively connected to said counter/timer gate input, said multiplexer selectively connecting said multiplexer first signal input to said multiplexer output in response to connection commands received at said multiplexer control input, whereby said counter/timer receives a trigger signal from an internal signal source.

2. A system of macro cells in an integrated microprocessor as in claim 1 wherein an external signal source having an output operatively connected to an external interface pin of the microprocessor provides a trigger signal, and in which said multiplexer has an external interface signal input operatively connected to the external signal source output via the external interface pin, said multiplexer selectively connecting said counter/timer gate input to the external source output in response to connection commands on the internal data bus to said multiplexer control input, whereby said counter/timer is triggerable from both internal and external signal sources.

3. A system of macro cells in an integrated microprocessor as in claim 1 in which said first signal source is a pulse wave modulator (PWM) having an output providing a trigger signal with a preselected frequency and a preselected pulse width, and an input operatively connected to the internal data bus to receive commands for selectively controlling the frequency and the pulse width of the output signal.

4. A system of macro cells in an integrated microprocessor as in claim 3 further comprising:

a second signal source having an output, said second signal source output providing a trigger signal at a first DC voltage to start the counting of the clock signal by said counter/timer; and said multiplexer having a second signal input operatively connected to said second signal source output to selectively provide said counter/timer gate input with said second signal source trigger signal in response to commands on the internal data bus to said multiplexer control input.

5. A system of macro cells in an integrated microprocessor as in claim 4 further comprising:

a third signal source having an output, said third signal source output providing a trigger signal at a second DC voltage to stop the counting of the clock signal by said counter/timer; and said multiplexer having a third signal input operatively connected to said third signal source output to selectively provide said counter/timer gate input with said third signal source trigger signal in response to commands on the internal data bus to said multiplexer control input.

6. A system of macro cells in an integrated micro processor as in claim 5 wherein an external signal source having an output operatively connected to an external interface pin of the microprocessor provides a trigger signal, and in which said multiplexer has an external interface signal input operatively connected to the external signal source output via the external interface pin, said multiplexer selectively connecting said counter/timer gate input to the external source output in response to connection commands on the internal data bus.

7. In an integrated microprocessor including a central processing unit (CPU), the microprocessor also including an internal data bus to communicate between macro cells, external interface pins, and a system clock having a clock signal, a system of macro cells comprising:

a first signal source having an output, said first signal source output providing a trigger signal;

a counter/timer having a clock input to receive the system clock signal, and a gate input responsive to trigger signals for counting clock cycles; and a first selective connection, internal to the microprocessor, synchronously connecting the output of said first signal source to said counter/timer gate input, to provide a trigger signal in response to commands on the internal data bus, whereby the propagation delay of trigger signals through said first connection is a uniform predetermined value.

8. A system of macro cells in an integrated microprocessor as in claim 7 further comprising:

a second signal source having an output, said second signal source output providing a trigger signal at a first DC voltage to start the counting of the clock signal by said counter/timer;

a third signal source having an output, said third signal source providing a trigger signal at a second DC voltage to stop the counting of the clock signal by said counter/timer;

a second selective connection, internal to the microprocessor, non-synchronously connecting the output of said second signal source to said counter/timer gate input, to provide a trigger signal in response to commands on the internal data bus; and a third selective connection, internal to the microprocessor, non-synchronously connecting the output of said third signal source to said counter/timer gate input, to provide a trigger signal in response to commands on the internal data bus, whereby the propagation delay of trigger signals through said second and third connections is not a uniform predetermined value.

9. In an integrated microprocessor with macro cells including a central processing unit (CPU), the microprocessor also including an internal data bus to communicate between macro cells, external interface pins, and a system clock to provide a clock signal, a system of macro cells comprising:

a counter/timer macro cell having a clock input to receive the system clock signal, a gate input responsive to trigger signals for counting clock cycles, and a gate control input operatively connected to the internal bus for controlling the selection of a signal source to trigger said counter/timer gate input;

a first signal source having an output, said first signal output providing an output signal to trigger the clock count in said counter/timer; and a first dedicated connection, internal to the microprocessor, selectively providing a trigger signal to said counter/timer gate input from said first signal source output in response to commands on the internal data bus.

10. A system of macro cells in an integrated microprocessor as in claim 9 in which said first signal source is a pulse wave modulator (PWM) having an output providing an output signal with a preselected pulse width and preselected frequency, and an input operatively connected to the internal data bus to receive commands for selectively controlling the frequency and pulse width of said PWM output signal.

11. A system of macro cells in an integrated microprocessor as in claim 10 further comprising:

a second signal source having a having an output providing a trigger signal at a first DC voltage to start the counting of the clock signal by said counter/timer;

a second dedicated connection, internal to the microprocessor, selectively providing the trigger signal to said counter/timer gate input from said second signal source output in response to commands on the internal data bus.

12. A system of macro cells in an integrated microprocessor as in claim 11 further comprising:

a third signal source having a having an output providing a trigger signal at a second DC voltage to stop the counting of the clock signal by said counter/timer;

a third dedicated connection, internal to the microprocessor, selectively providing the trigger signal to said counter/timer gate input from said third signal source output in response to commands on the internal data bus.

13. A system of macro cells in an integrated microprocessor as in claim 12 wherein an external signal source having an output operatively connected to an external interface pin of the microprocessor provides a trigger signal, and including an external interface dedicated connection, internal to the microprocessor, selectively providing a trigger signal to said counter/timer gate input from said external signal source output via the external interface pin, in response to commands on the internal data bus.

14. A system of macro cells in an integrated microprocessor as in claim 13 in which said first, second, third, and external interface dedicated connections are a signal multiplexer, said multiplexer having a first signal input operatively connected to said PWM output, a second signal input operatively connected to said second signal source output, a third signal input operatively connected to said third signal source output, an external interface signal input operatively connected to the external signal source output via the external interface pin of the microprocessor, an output operatively connected to said counter/timer gate input, and a control input operatively connected to the internal data bus to receive connecting commands, said multiplexer selectively connecting said multiplexer output to one of said multiplexer signal inputs to provide a trigger signal to said counter/timer gate input, in response to commands on the internal data bus to said multiplexer control input.

15. A system of macro cells in an integrated microprocessor as in claim 10 in which said counter/timer is a plurality of n counter/timers, said PWM is plurality of n PWMs, and said first connection is a plurality of n connections, each one of said plurality of n connections providing a selective connection between one of n exclusive pairs formed from combining one of said plurality of PWMs with one of said plurality of counter/timers, whereby one of said plurality of n counter/timers is selectively triggered by said paired PWM in response to commands on the internal data bus.

16. A system of macro cells in an integrated microprocessor as in claim 9 wherein an external signal source having an output operatively connected to an external interface pin of the microprocessor provides a trigger signal, and including an external interface dedicated connection, internal to the microprocessor, selectively providing the trigger signal to said counter/timer gate input from the external signal source output via the external interface pin, in response to commands on the internal data bus.

17. A system of macro cells in an integrated microprocessor as in claim 16 in which said first, and said external interface dedicated connections are a signal multiplexer having a first signal input operatively connected to said first signal source output, an external interface signal input operatively connected to the external signal source output via the external interface pin of the microprocessor, an output operatively connected to said counter/timer gate input, and a control input operatively connected to the internal data bus to receive connecting commands, said multiplexer selectively connecting said multiplexer output to one of said multiplexer signal inputs, to provide a trigger signal to said counter/timer gate input, in response to commands on the internal data bus to said multiplexer control input.

18. In an integrated microprocessor with macro cells including a central processing unit (CPU), a counter/timer, and a first signal source, the microprocessor also including an internal data bus and a plurality of dedicated internal connections to communicate between macro cells, an external data bus to accept user commands, external interface pins, and a system clock, a method for controlling including the steps of:
 a) selecting the first signal source in response to commands on the internal data bus;
 b) generating a first signal source output signal to provide a trigger signal to the counter/timer gate input;
 c) delivering the trigger signal to the counter/timer gate input on the first dedicated connection internal to the microprocessor;
 d) counting system clock cycles by the counter/timer in response to the arrival of the trigger signal delivered in step c); and
 e) creating a counter/timer output signal in response to programming from the CPU, whereby the internal data bus is used to select the first signal source output signal as the counter/timer trigger source.

19. A method for controlling macro cells in an integrated microprocessor as in claim 18 in which said first signal source is a pulse wave modulator (PWM) having a selectable frequency and selectable pulse width generated in response to commands on the internal data bus.

20. A method for controlling macro cells in an integrated microprocessor as in claim 19 wherein an external signal source having an output operatively connected to an external interface pin of the microprocessor provides a trigger signal, and including the further steps of:
 selecting the external signal source to provide the trigger signal to the counter/timer gate input in response to commands on the internal data bus; and
 delivering the external source output signal from the external interface pin to the counter/timer gate input on an external interface dedicated connection, internal to the microprocessor.

21. A method for controlling macro cells in an integrated microprocessor as in claim 20 wherein the microprocessor includes a signal multiplexer having at least two signal inputs, an output, and a control input, and in which the dedicated connections between signal sources and the counter/timer gate input are made through the multiplexer, a first multiplexer signal input operatively connected to the signal source internal to the microprocessor, an external interface signal input operatively connected to the external signal source via the external interface pin of the microprocessor, the multiplexer output operatively connected to the counter/timer gate input, and the multiplexer control input operatively connected to the internal data bus, and including the step of delivering one of the signal sources to the counter/timer gate input through the multiplexer, to provide a trigger signal in response to commands on the internal data bus to the multiplexer control input.

22. A method for controlling macro cells in an integrated microprocessor as in claim 19 wherein the microprocessor includes a plurality of signal sources, and including the steps of:
 selecting a second signal source to provide a trigger signal at a first DC voltage to start the counting of the clock signal by the counter/timer in response to commands on the internal data bus; and
 delivering the second source output signal to the counter/timer gate input on a second dedicated connection internal to the microprocessor.

23. A method for controlling macro cells in an integrated microprocessor as in claim 22 including the steps of:
 selecting a third signal source to provide a trigger signal at a second DC voltage to stop the counting of the clock signal by the counter/timer in response to commands on the internal data bus; and
 delivering the third source output signal to the counter/timer gate input on a third dedicated connection internal to the microprocessor.

24. A method for controlling an integrated microprocessor as in claim 23 wherein an external signal source having an output operatively connected to an external interface pin of the microprocessor provides a trigger signal, and including the steps of:
 selecting the external signal source output to provide the trigger signal to the counter/timer gate input in response to commands on the internal data bus; and
 delivering the external signal source trigger signal from the external interface pin to the counter/timer gate input on an external interface dedicated connection, internal to the microprocessor.

25. A method for controlling macro cells in an integrated microprocessor as in claim 24 wherein the microprocessor includes a signal multiplexer having a plurality of signal inputs, an output, a control input, and in which the dedicated connections between signal sources and the counter/timer gate input are made through the multiplexer, a first multiplexer signal input operatively connected to the PWM output, a second multiplexer signal input operatively connected to the second signal source, a third multiplexer signal source operatively connected to the third signal source, an external interface signal input operatively connected to the external signal source via the external interface pin of the microprocessor, the multiplexer output operatively connected to the counter/timer gate input, and the multiplexer control input operatively connected to the internal data bus, and including the step of delivering one of the signal sources to the counter/timer gate input through the multiplexer, to provide a trigger signal in response to commands on the internal data bus to the multiplexer control input.

26. A method for controlling macro cells in an integrated microprocessor as in claim 22 wherein the microprocessor includes a signal multiplexer having at least three signal inputs, an output, a control input, and in which the dedicated connections between signal sources and the counter/timer gate input are made through the multiplexer, a first multiplexer signal input operatively connected to the PWM output, a second multiplexer signal input operatively connected to the second signal source, a third multiplexer signal source operatively connected to the third signal source, the multiplexer output operatively connected to the counter/timer gate input, and the multiplexer control input operatively connected to the internal data bus, and including the step of delivering one of the signal sources to the counter/timer gate input through the multiplexer, to provide a trigger signal in response to commands on the internal data bus to the multiplexer control input.

27. In an integrated microprocessor with macro cells including a central processing unit (CPU), a counter/timer, and a first signal source having a preselected frequency and preselected pulse width, a second signal source having a first DC voltage, and a third signal source having a second DC voltage, the microprocessor also including an internal data bus and a plurality of dedicated internal connections to communicate between macro cells, an external data bus to accept user commands, external interface pins, and a system clock, and wherein an external signal source having an output is operatively connected to an external interface pin of the microprocessor to provide trigger signals, a method for controlling including the steps of:

a) selecting a signal source to provide a trigger signal to the counter/timer in response to commands on the internal data bus;
b) determining if the selected trigger source is internal to the microprocessor;
   i) when the selected trigger signal is external, performing the following steps:
   1) generating an external signal source trigger signal;
   2) delivering the external signal source to the counter/timer input on an external interface dedicated connection;
   3) starting the counting of the clock signal by the counter/timer in response to the arrival of the trigger signal; and
   4) stopping the counting of the clock signal by the counter/timer in response to the arrival of the trigger signal; and
   ii) when the selected trigger signal is internal, continuing to the next step;
c) determining if the selected trigger signal is synchronous;
   i) when the selected trigger signal is non-synchronous, performing the following steps:
   1) delivering the second signal source to provide a trigger signal to the counter/timer gate input on a second dedicated connection;
   2) starting the counting of the clock signal by the counter/timer in response to the arrival of the trigger signal;
   3) delivering the third signal source to provide a trigger signal to the counter/timer gate input on a third dedicated connection; and
   4) stopping the counting of the clock signal by the counter/timer in response to the arrival of the trigger signal; and
   ii) when the selected trigger signal is synchronous, performing the following steps:
   1) generating a first signal source trigger signal;
   2) delivering the first signal source trigger signal to the counter/timer gate input on a first dedicated connection;
   3) starting the counting of the clock signal by the counter/timer in response to the arrival of the trigger signal; and
   4) stopping the counting of the clock signals by the counter/timer in response to the arrival of the trigger signal.

28. A method for controlling macro cells in an integrated microprocessor as in claim 27 in which said first signal source is a pulse wave modulator (PWM) having a selectable frequency and selectable pulse width generated in response to commands on the internal data bus.

* * * * *